US010193417B2

(12) United States Patent
Fogle et al.

(10) Patent No.: US 10,193,417 B2
(45) Date of Patent: Jan. 29, 2019

(54) BRUSHLESS MOTOR ASSEMBLY FOR A FASTENING TOOL

(71) Applicant: Black & Decker Inc., New Britain, CT (US)

(72) Inventors: John B. Fogle, White Hall, MD (US);
Colin M. Crosby, Baltimore, MD (US);
David J. Smith, Columbia, MD (US);
Merritt J. Tennison, Seattle, WA (US);
Madhur M. Purohit, Towson, MD (US)

(73) Assignee: Black & Decker Inc., New Britain, CT (US)

( * ) Notice: Subject to any disclaimer, the term of this patent is extended or adjusted under 35 U.S.C. 154(b) by 334 days.

(21) Appl. No.: 14/973,090

(22) Filed: Dec. 17, 2015

(65) Prior Publication Data

US 2016/0181891 A1 Jun. 23, 2016

Related U.S. Application Data

(60) Provisional application No. 62/093,785, filed on Dec. 18, 2014, provisional application No. 62/093,803, filed on Dec. 18, 2014.

(51) Int. Cl.
*H02K 7/14* (2006.01)
*B25F 5/02* (2006.01)
(Continued)

(52) U.S. Cl.
CPC ............. *H02K 7/145* (2013.01); *B25F 5/02* (2013.01); *H02K 1/27* (2013.01); *H02K 1/2786* (2013.01);
(Continued)

(58) Field of Classification Search
CPC .......... B25F 5/02; H02K 11/215; H02K 11/33; H02K 1/187
(Continued)

(56) References Cited

U.S. PATENT DOCUMENTS

| 3,968,920 A | 7/1976 | Ballinger |
| 4,107,591 A | 8/1978 | Herr |

(Continued)

FOREIGN PATENT DOCUMENTS

| EP | 2433757 A2 | 3/2012 |
| WO | 9827638 A1 | 6/1998 |

(Continued)

OTHER PUBLICATIONS

EP Search Report dated Jul. 5, 2016.
EPO Communication Article 94(3) EPC, dated Jun. 10, 2017.

*Primary Examiner* — Bernard Rojas
(74) *Attorney, Agent, or Firm* — Amir Rohani

(57) ABSTRACT

An electric brushless DC motor is provided including an outer rotor assembly having a metallic rotor body, rotor magnets mounted within an inner surface of the rotor body, and a molded structure formed within the rotor body. The molded structure includes a main body formed on inner surface of the rotor body to securely cover and retain the rotor magnets on the inner surface of the rotor body, an axial fan formed at an end of the rotor body opposite the rotor magnets, and a sense magnet mount formed at approximately a radial center portion of the axial fan. Alternatively or additionally, the molded structure includes a radial member projecting inwardly from the main body towards a center of the outer rotor assembly, and a bearing support member having a substantially cylindrical shape in an axial direction of the outer rotor and supported by the at least one radial member.

23 Claims, 14 Drawing Sheets

(51) Int. Cl.
*H02K 29/08* (2006.01)
*H02K 1/27* (2006.01)
*H02K 7/08* (2006.01)
*H02K 9/06* (2006.01)
*H02K 11/215* (2016.01)
*H02K 1/28* (2006.01)
*H02K 5/16* (2006.01)
*H02K 7/02* (2006.01)
*H02K 11/00* (2016.01)
*H02K 1/18* (2006.01)
*H02K 11/33* (2016.01)

(52) U.S. Cl.
CPC ............... *H02K 1/28* (2013.01); *H02K 5/161* (2013.01); *H02K 7/02* (2013.01); *H02K 7/086* (2013.01); *H02K 9/06* (2013.01); *H02K 11/0073* (2013.01); *H02K 11/215* (2016.01); *H02K 29/08* (2013.01); *H02K 1/187* (2013.01); *H02K 11/33* (2016.01); *H02K 2203/03* (2013.01)

(58) Field of Classification Search
USPC .................... 310/43, 50, 156.78–156.84
See application file for complete search history.

(56) References Cited

U.S. PATENT DOCUMENTS

| | | | |
|---|---|---|---|
| 4,164,690 A | 8/1979 | Muller et al. | |
| 4,573,874 A | 3/1986 | Andersen et al. | |
| 4,647,806 A | 3/1987 | Giuffrida | |
| 4,839,552 A | 6/1989 | Takaba | |
| 5,001,581 A | 3/1991 | Elsaesser et al. | |
| RE35,792 E | 5/1998 | Elsasser et al. | |
| 5,774,302 A | 6/1998 | Elsaesser et al. | |
| 5,844,338 A | 12/1998 | Horski | |
| 5,866,961 A | 2/1999 | Suzuki et al. | |
| 5,895,207 A | 4/1999 | Burgdorf et al. | |
| 6,127,760 A * | 10/2000 | Nagasaki ............... H02K 1/146 310/194 |
| 6,133,660 A | 10/2000 | Suzuki et al. | |
| 6,300,695 B1 | 10/2001 | Neal | |
| 6,501,616 B1 | 12/2002 | Neal | |
| 6,971,567 B1 | 12/2005 | Cannaliato et al. | |
| 7,012,346 B2 | 3/2006 | Hoffman et al. | |
| 7,015,603 B2 | 3/2006 | Barrho et al. | |
| 7,023,116 B2 | 4/2006 | Kuribara | |
| 7,276,826 B2 | 10/2007 | Nishidate | |
| 7,276,828 B2 | 10/2007 | Yeh et al. | |
| 7,394,174 B2 | 7/2008 | Blase et al. | |
| 7,667,357 B2 | 2/2010 | Okada et al. | |
| 7,679,230 B2 | 3/2010 | Yamada et al. | |
| 7,804,213 B2 | 9/2010 | Hoffman et al. | |
| 7,825,550 B2 | 11/2010 | Yamada et al. | |
| 7,888,833 B2 | 2/2011 | Okada | |
| 7,994,663 B2 | 8/2011 | Harata et al. | |
| 8,047,415 B2 | 11/2011 | Kunz et al. | |
| 8,096,456 B2 | 1/2012 | Kunz et al. | |
| 8,129,872 B2 | 3/2012 | Hoffman et al. | |
| 8,132,702 B2 | 3/2012 | Kunz et al. | |
| 8,141,248 B2 | 3/2012 | de Andrade Filho et al. | |
| 8,427,020 B2 | 4/2013 | Hoffman et al. | |
| 8,545,193 B2 * | 10/2013 | Kim ..................... F04D 29/668 417/354 |
| 8,616,028 B2 | 12/2013 | Kim et al. | |
| 8,643,231 B2 | 2/2014 | Flanary | |
| 9,126,319 B2 | 9/2015 | Gross et al. | |
| 2001/0033111 A1 | 10/2001 | Choi | |
| 2005/0201861 A1 | 9/2005 | Yoshida et al. | |
| 2006/0071563 A1 | 4/2006 | Fujii | |
| 2008/0122322 A1 * | 5/2008 | Izumi ................. F04D 25/0613 310/67 R |
| 2009/0284087 A1 | 11/2009 | Takahashi et al. | |
| 2012/0194112 A1 | 8/2012 | Purohit | |
| 2013/0055771 A1 | 3/2013 | Tashiro et al. | |
| 2013/0093275 A1 | 4/2013 | Kim | |
| 2013/0280090 A1 * | 10/2013 | Sato ..................... F04D 29/263 416/244 R |
| 2016/0138598 A1 * | 5/2016 | Park ..................... F25D 17/067 62/419 |
| 2016/0329793 A1 * | 11/2016 | Li ........................ H02K 1/2786 |
| 2017/0222501 A1 * | 8/2017 | Chu ....................... H02K 1/146 |

FOREIGN PATENT DOCUMENTS

| | | |
|---|---|---|
| WO | 2010087235 A1 | 8/2010 |
| WO | 2011131251 A1 | 10/2011 |

* cited by examiner

BRUSHLESS MOTOR ASSEMBLY FOR A FASTENING TOOL

RELATED APPLICATION

This disclosure claims the benefit of U.S. Provisional Application No. 62/093,803 filed Dec. 18, 2014 and U.S. Provisional Application No. 62/093,785 filed Dec. 18, 2014, which are incorporated herein by reference in their entirety.

FIELD OF THE DISCLOSURE

This disclosure relates to power tools. More particularly, the present invention relates to brushless motor assembly for a fastening power tool.

BACKGROUND

Finish Nailers are fastening tools used in construction for crown molding, cabinet molding, door installation, exterior trim and variety of other finish operations. Finish nailers are may be gas powered, pneumatic or electro-magnetic depending on the source of energy for operation of nail firing mechanism. An electro-magnetically powered nailer uses a motor as a prime mover that drives a flywheel. In battery-powered applications, the motor may be, for example, a brushed DC motor or a brushless DC motor. The nailer battery may include, for example, Li-Ion/Ni—Cd battery cells. Flywheel runs at a pre-defined speed, thus storing energy in the form of kinetic energy. This kinetic energy is then transferred to the mechanical linkage that drives the nails.

Finish nailer need a lot less energy as compared to other nailing applications such as framing, fencing or concrete. The nail sizes are typically 15Ga to 18Ga in diameter. The main user critical-to-quality requirement for a finish nailer is small size and light weight. What is therefore needed is to provide a motor design that is compact yet capable of outputting sufficient power to drive the fastener.

SUMMARY

According to an embodiment of the invention, an electric brushless DC (BLDC) motor is provided, comprising: an outer rotor assembly having a substantially-cylindrical metallic rotor body, rotor magnets mounted within an inner surface of the rotor body, and a molded structure formed within the rotor body. In an embodiment, the molded structure includes a main body formed on an inner surface of the rotor body to securely cover and retain the rotor magnets on the inner surface of the rotor body, an axial fan formed at an end of the rotor body opposite the rotor magnets, and a sense magnet mount formed at approximately a radial center portion of the axial fan. In an embodiment, the motor further includes a stator assembly received inside the outer rotor assembly and mounted on a shaft; and a sense magnet ring mounted on the sense magnet mount.

In an embodiment, the molded structure includes at least one of a proxy, plastic, or resin material.

In an embodiment, the outer rotor assembly further includes a flywheel integrally formed on an outer surface of the rotor body.

In an embodiment, the molded structure integrally includes at least one radial member projecting inwardly from the main body towards a center of the outer rotor assembly between the axial fan and the rotor magnets; and a bearing support member having a substantially cylindrical shape in an axial direction of the outer rotor and supported by the at least one radial member.

In an embodiment, the radial member includes radial fan blades angularly disposed to generate an airflow with the rotation of the outer rotor.

In an embodiment, the bearing support member is configured to securely receive two bearings affixed to the shaft therein.

In an embodiment, the rotor body integrally includes a radial member projecting inwardly from the inner surface of the rotor body towards a center of the outer rotor assembly between the axial fan and the rotor magnets; and a bearing support member having a substantially cylindrical shape in an axial direction of the outer rotor and supported by the at least one radial member.

In an embodiment, the molded structure also includes a radial portion covering the ends of the radial member.

In an embodiment, the radial member includes through-holes around the bearing support member to provide airflow communication between the axial fan and the stator assembly.

In an embodiment, the bearing support member is configured to securely receive two bearings affixed to the shaft therein.

According to an embodiment, a power tool is provided including a housing and an electric brushless DC (BLDC) motor according to the above description disposed within the housing.

According to another embodiment of the invention, an electric brushless DC (BLDC) motor is provided including an outer rotor assembly having a substantially-cylindrical metallic rotor body, rotor magnets mounted within an inner surface of the rotor body, and a molded structure formed within the rotor body. In an embodiment, the molded structure integrally includes a main body formed on an inner surface of the rotor body, at least one radial member projecting inwardly from the main body towards a center of the outer rotor assembly between the axial fan and the rotor magnets, and a bearing support member having a substantially cylindrical shape in an axial direction of the outer rotor and supported by the at least one radial member. In an embodiment, the motor further includes a stator assembly received inside the outer rotor assembly and mounted on a shaft, the shaft being received inside the bearing support member and affixed rotatably therein via two bearings affixed to the shaft therein.

In an embodiment, the molded structure comprises at least one of a proxy, plastic, or resin material.

In an embodiment, the outer rotor assembly further includes a flywheel integrally formed on an outer surface of the rotor body.

In an embodiment, the molded structure integrally includes a magnet retention portion covering and retaining the rotor magnets on the inner surface of the rotor body.

In an embodiment, the molded structure integrally includes an axial fan formed at an end of the rotor body opposite the rotor magnets.

In an embodiment, the molded structure integrally includes a sense magnet mount formed at an end of the bearing support member opposite the stator assembly, the electric motor further comprising a sense magnet ring mounted on the sense magnet mount.

In an embodiment, the at least one radial member includes a radial fan blades angularly disposed to generate an airflow with the rotation of the outer rotor.

According to an embodiment, a power tool is provided including a housing and an electric brushless DC (BLDC) motor as described above disposed within the housing.

BRIEF DESCRIPTION OF THE DRAWINGS

The drawings described herein are for illustration purposes only and are not intended to limit the scope of this disclosure in any way.

Corresponding reference numerals indicate corresponding parts throughout the several views of the drawings.

DETAILED DESCRIPTION

Figure 1:
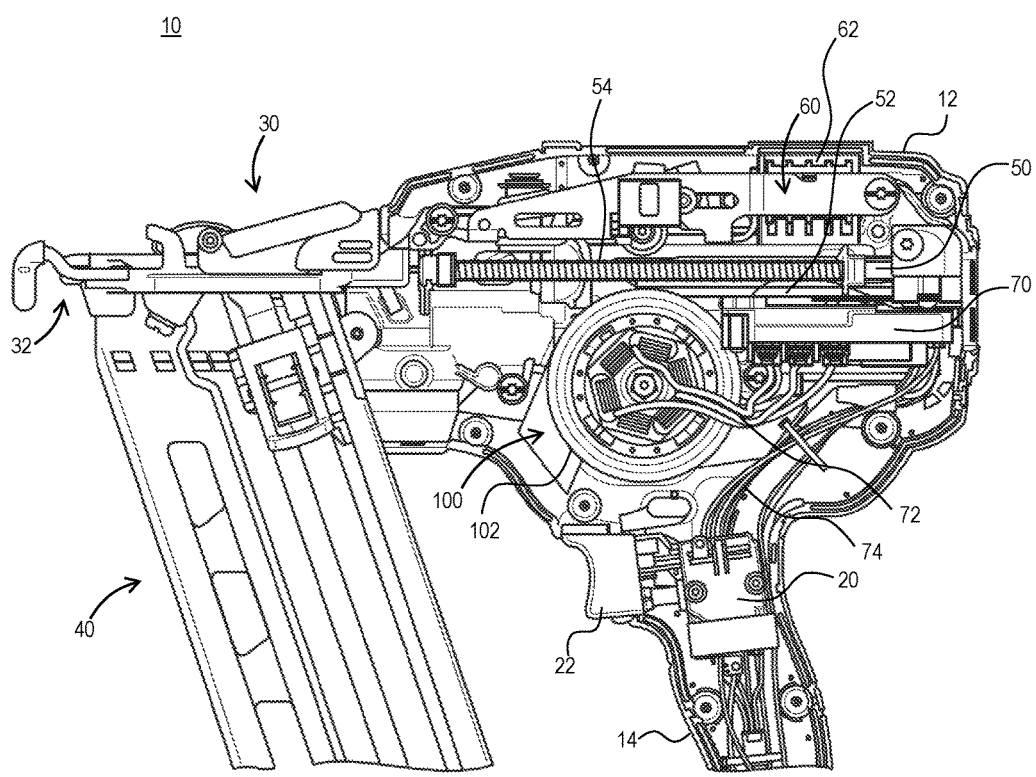
FIG. 1 depicts a side view of a fastening tool with a housing half removed, according to an embodiment.

FIG. 1 depicts a perspective view of a fastening tool 10 (e.g., a nailer) with a housing half removed, according to an embodiment. The fastening tool 10 shown herein includes an outer-rotor brushless DC motor 100. The outer rotor of the motor 100 is integrally formed with a flywheel 102. In an embodiment, the fastening tool 10 further includes a housing 12, an input unit 20 housed within a handle 14 of the housing and coupled to an actuator 22 disposed outside the housing 12, and a control unit 70. In an embodiment, control unit 70 includes a micro-controller or other programmable control module and power switching components for controlling a commutation of the motor 100. Control unit 70 is coupled to a power source (not shown), which may be a DC power source (e.g., a removable battery pack) or an AC power source (e.g., a 120V AC). Control unit 70 is also coupled to the input unit 20 via wires 74 and regulates a supply of power from the power source to the motor 100 based on a logic signal from the input unit 20. Control unit 70 is coupled to motor terminals via three lead wires 72.

In an embodiment, fastening tool 10 further includes a nosepiece assembly 30 including a contract trip mechanism 32 coupled to the housing 12, a magazine assembly 40, a driver assembly 50 including a driver 52 and a return mechanism 52, an activation assembly 60, and a solenoid 62, among other components. In an embodiment, actuation of the actuator 22 while contact trip mechanism 32 is in contact with a workpiece causes the solenoid 62 to engage the activation assembly 62. Activation assembly 62 translates forward and engages the driver 52 to initiate driving engagement between the driver 52 and the flywheel 102. In an embodiment, the flywheel 102 includes one or more flywheel rings that form one or more grooves around the outer surface of the flywheel 102. The driver 52 includes corresponding railings that engage the grooves of the flywheel. Rotation of the flywheel 102 causes the driver 52 to accelerate axially and drive a fastener into a workpiece.

The present disclosure is focused on the structure and features of the motor 100. Details of the components and operation of an exemplary fastening tool are beyond the scope of this disclosure and can be found in U.S. Pat. No. 6,971,567 and US. Patent Publication No. 2012/0097729, both of which are incorporated herein by reference in their entirety. It is further noted that while the motor 100 of this disclosure is described with reference to a fastening tool according to an exemplary embodiment, motor 100 may similarly be used in other power tools and other rotary devices.

Figure 2A:
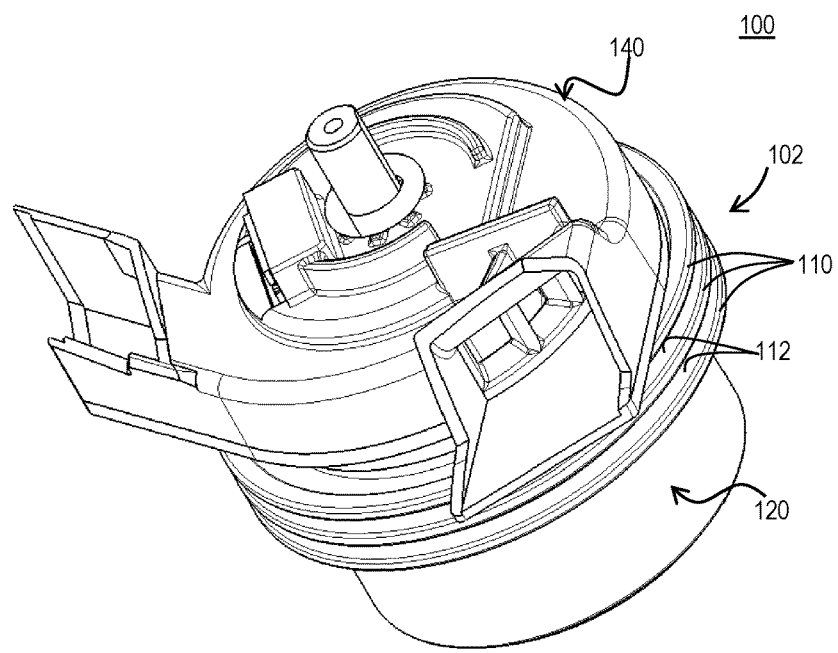
FIGS. 2A and 2B depict front and back perspective views of an overmolded outer-rotor brushless motor with an integrated flywheel, according to an embodiment.
Figure 2B:
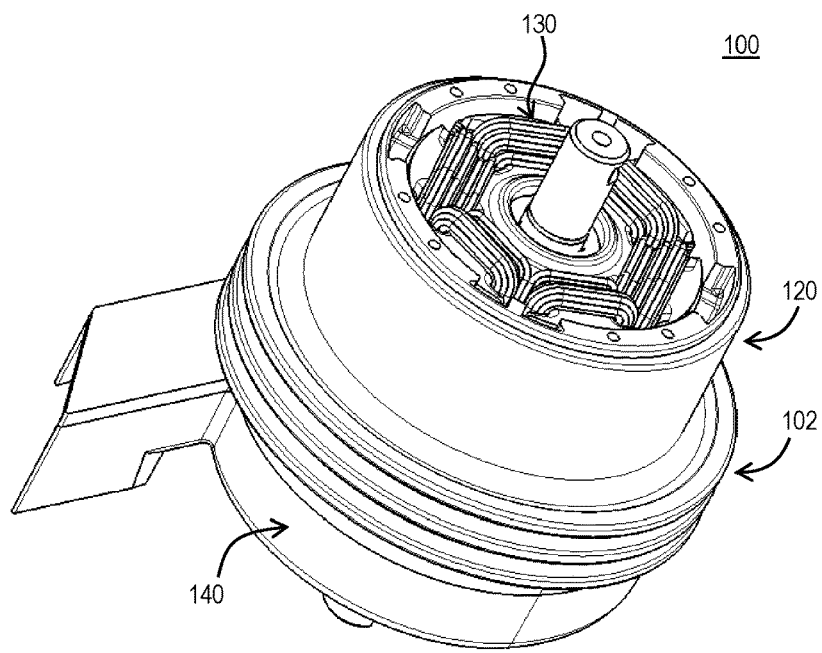

FIGS. 2A and 2B depict front and back perspective views of an outer-rotor brushless DC (BLDC) motor 100 with flywheel 102, according to an embodiment. In an embodiment, flywheel 102 includes three flywheel annular rings 110 that form grooves 112 there between around the outer surface of the flywheel 102. In an embodiment, flywheel 102 is formed integrally with rotor 120 on an external circumferential surface of the rotor 120 having an increased diameter compared to the remainder of the rotor 120. Alternatively, flywheel 102 may be provided as a separate part attached to an outer surface of the rotor 120. Flywheel 102 may be made of metal such as steel.

Figure 3A:
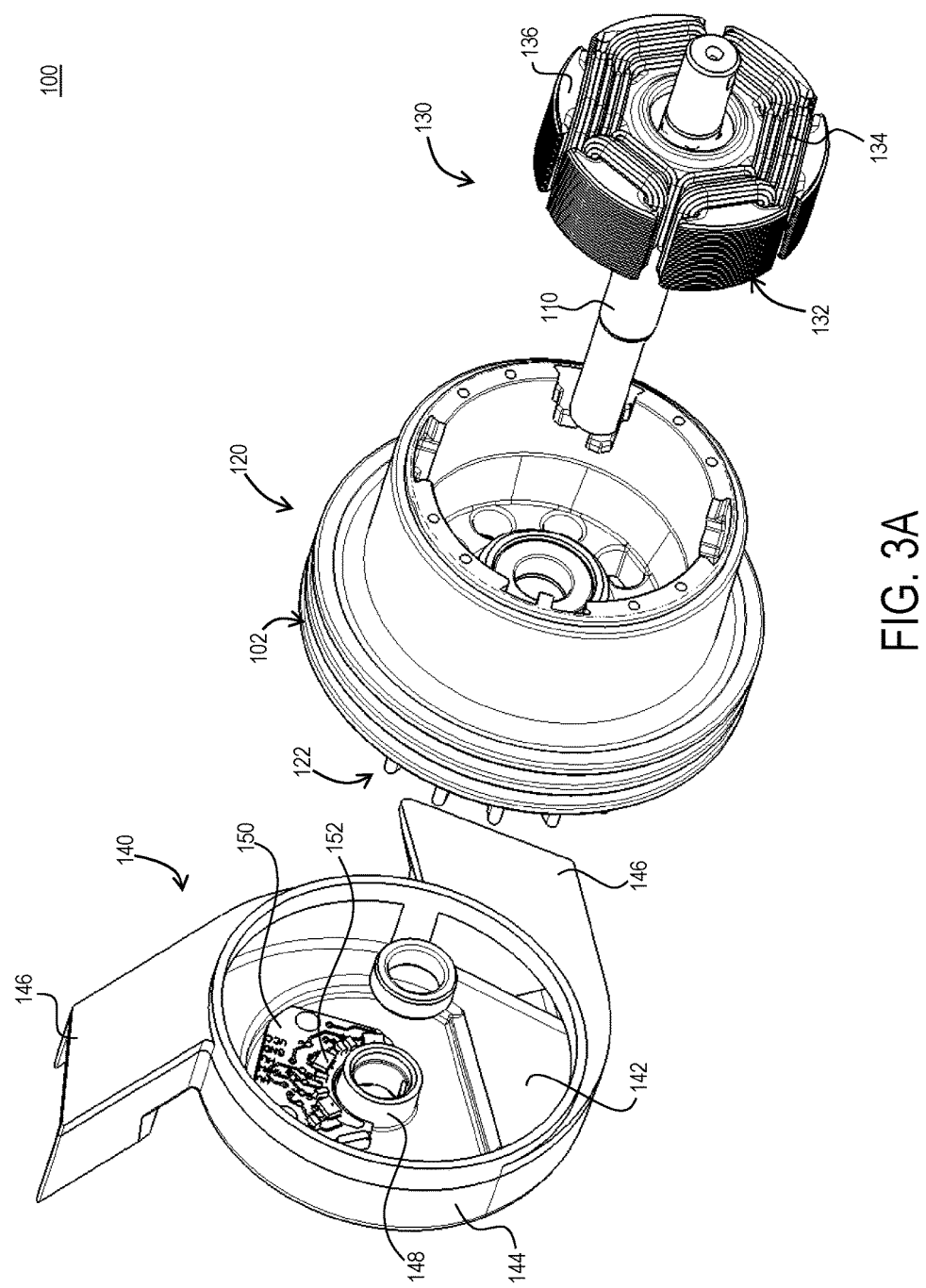
FIGS. 3A and 3B depict front and back exploded views of the outer-rotor brushless motor, according to an embodiment.
Figure 3B:
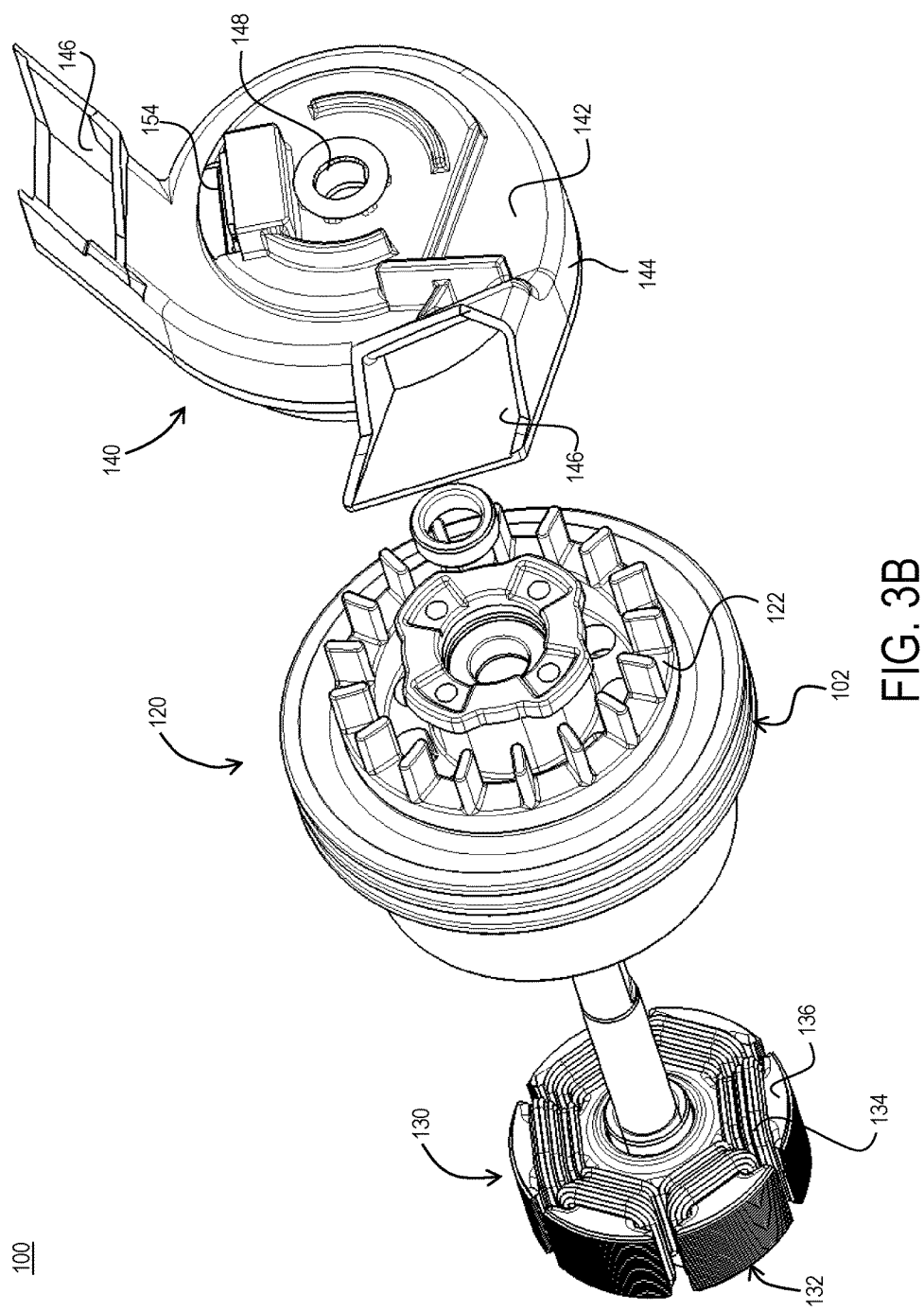
Figure 4:
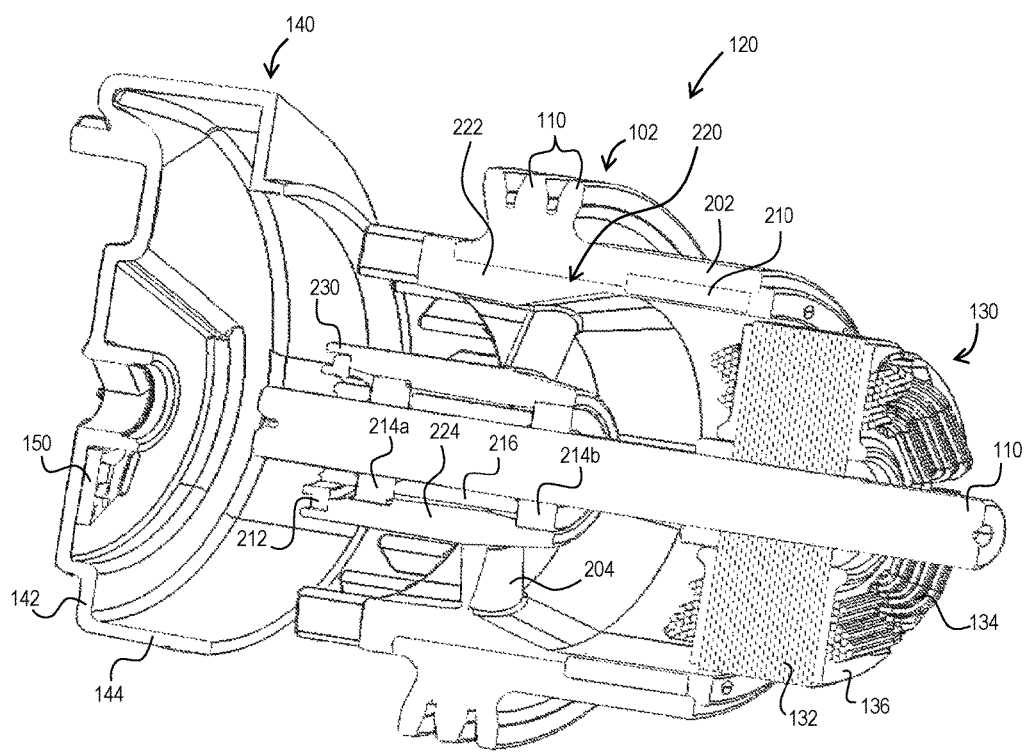
FIG. 4 depicts a partially cut-off exploded view of the outer-rotor brushless motor, according to an embodiment.

FIGS. 3A and 3B depict front and back exploded views of motor 100, according to an embodiment. FIG. 4 depicts a partially cut-off and partially-exploded view of the brushless motor 100, according to an embodiment. As shown in these figures, in addition to the outer rotor 120, motor 100 includes a stator assembly 130 coupled to a shaft 110, and a motor end cap 140.

In an embodiment, stator assembly 130 includes a stator lamination stack 132 having a plurality of stator teeth with slots formed therebetween. Stator windings 134 are wound around the stator teeth defining the phases of the motor 100. In an embodiment, where motor 100 is a three-phase BLDC motor, three windings 134 defining the three phases of the motor 100 are disposed around the stator lamination stack 132, each winding 134 being wound on opposite two teeth across one another. In an embodiment, stator assembly 130 further includes two end insulators 136 attached to the end surfaces of the stator lamination stack 132. In an embodiment, the stator lamination stack 132 is mounted (e.g., via press-fitting) on a shaft 110.

In an embodiment, motor end cap 140 is disposed at an end of the motor 100 and also mounted (e.g., via press-fitting) on the shaft 110 opposite the stator assembly 130. Motor end cap 140 includes a back plate 142 disposed adjacent a fan 122 of the rotor 120 (discussed below) that acts as a baffle for the fan 122. End cap 140 also includes a circumferential portion 144 with air conduits 146 to redirect the air flow from the fan 122 towards other parts of the tool 10, for example, the control unit 70 (see FIG. 1). End cap 140 includes a through-hole 148 sized to securely receive the shaft 110.

In an embodiment, end cap 140 further includes a rotational position sensor board 150 therein. Positional sensor board 150 may include, for example, three Hall sensors 152 facing the rotor 120 and a connector 154 projecting outside the back plate 142 to be accessible from outside the motor 100.

The outer-rotor 120 is described herein, according to an embodiment of the invention. Use of a flywheel on an outer-rotor of a brushless motor is known. An example of such an assembly is described in U.S. Pat. No. 8,047,415, which is incorporated herein by reference in its entirety. The present embodiment describes an improved outer-rotor for a brushless motor, wherein in an embodiment, the rotor components, including the rotor fan, bearing pocket, etc. are formed within the rotor using a simple mold in an efficient, compact, and easy to manufacture process, as described in detail below.

Figure 5:
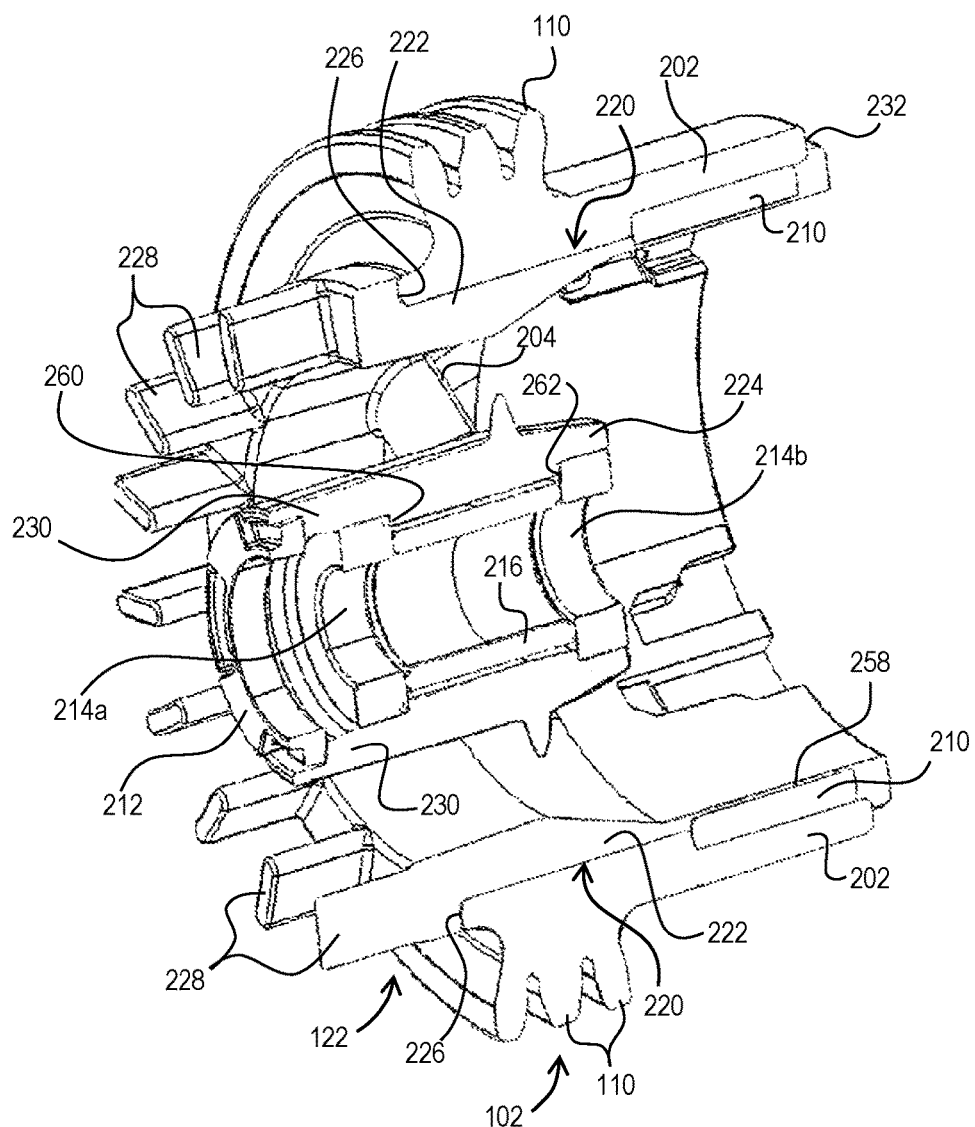
FIG. 5 depicts a partially cut-off perspective view of the outer-rotor assembly of the brushless motor, according to an embodiment.

FIG. 5 depicts a cut-off perspective view of the outer-rotor assembly 120, according to a first embodiment of the invention. As shown in this figure, and further with reference to FIG. 4, in an embodiment, outer-rotor assembly 120 includes a substantially-cylindrical metallic rotor body 202 on which the flywheel 102, including annular rings 110, is integrally formed. Rotor body 202 and flywheel 102 may be formed of any metallic material such as steel. Rotor magnets 210 are secured to an inner surface of the rotor body 202. A fan/rotor molded structure 220 is molded inside the rotor body 202 to form and/or support various rotor assembly 120 components, as discussed herein. In an embodiment, fan/rotor molded structure 220 is formed from epoxy, resin, plastic, or any other moldable non-conductive material.

In an embodiment, the fan/rotor molded structure 220 includes a main body 222 formed primarily inside an inner surface of the rotor body 202. The fan/rotor molded structure 220 further includes a plurality of radial members 204 projecting inwardly from the main body 222 towards a center of the rotor 120. At the center of the rotor 120, the fan/rotor molded structure 220 forms a bearing support member 224 that supports one or more shaft ball bearings 214a, 214b. The radial members 204 may be disposed at angularly (i.e., substantially diagonally) so as to form blades of a radial fan that generates airflow with the rotation of the rotor 120. Bearing support member 224 may be cylindrical and elongated, sized to press-fittingly receive the bearings 214a and 214b. In an embodiment, the bearing support member 224 is disposed along a center portion of the rotor 120 near the stator assembly 130. As such both bearings 214a and 214b are secured to the rotor assembly 120 on one side of the stator assembly 130. This arrangement substantially eases the assembly process.

In an embodiment, the fan/rotor molded structure 220 is additionally formed with a plurality of blades 228 axially extending from the distal end 226 of the main body 222 to form the axial fan 122 proximate the end cap 140. In an embodiment, main body 202 of the fan/rotor molded structure 220 extends to an axial end 232 of the rotor main body 202 opposite the fan 122 to cover the rotor permanent magnets 210 on the inner surface of the rotor main body 202. In an embodiment, bearing support member 224 of the fan/rotor molded structure 220 additionally includes a sense magnet mount 230 for sense magnet ring 212 in the vicinity of the fan 122. These features are described herein in detail.

It is noted that while the fan/rotor molded structure 220 herein may be obtained using any molding mechanisms such as over-molding, insert-molding or injection-molding.

Figure 6:
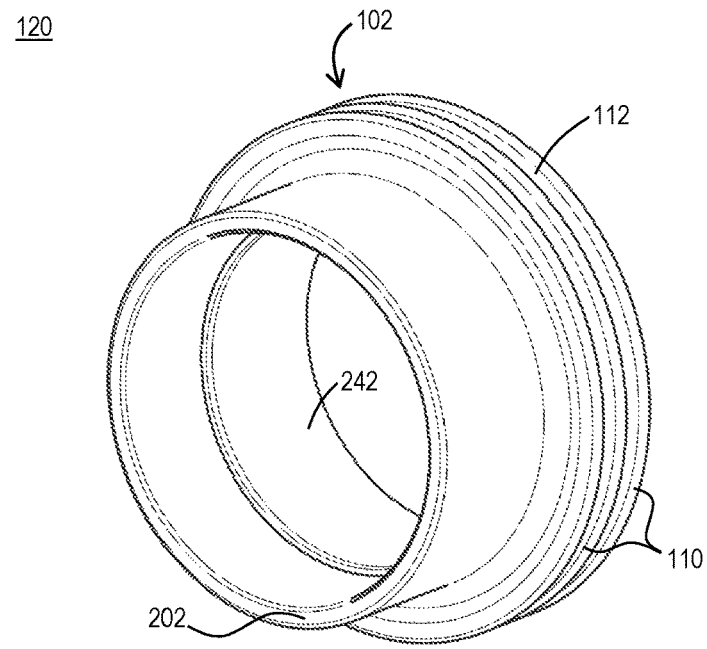
FIG. 6 depicts a perspective view of the outer-rotor main body and flywheel, according to an embodiment.

FIG. 6 depicts a perspective view of the substantially-cylindrical rotor body 202 including the flywheel 102, without the fan/rotor molded structure 220, according to an embodiment. As discussed above, the flywheel 102 includes two or more annular rings 110 on the outer surface of the rotor body 202 near one end, forming one or more annular grooves 112 therebetween.

Figure 7:
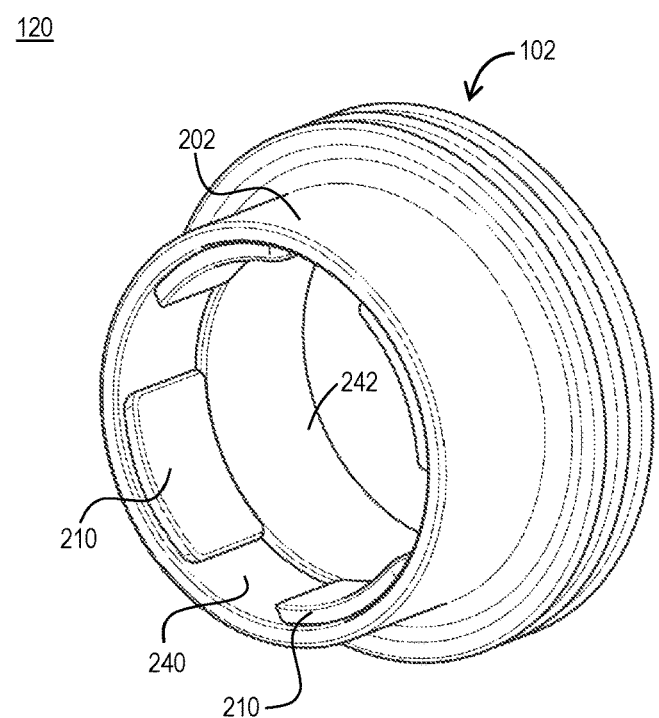
FIG. 7 depicts a perspective view of the outer-rotor main body with rotor magnets assembled therein, according to an embodiment.

FIG. 7 depicts the rotor body 202 including the flywheel 102, with rotor magnets 210 mounted therein, according to an embodiment. In an embodiment, four permanent magnets (e.g., ferrite or rare earth magnets) 210 are securely placed inside an inner surface of the rotor body 202. In an embodiment, the inner surface of the rotor body 202 may include a mounting portion 240 that is recessed from the rest of its inner surface 242 where the flywheel 102 is located, such that the surface of the magnet 210 is substantially on the same cylindrical plane as the surface 242. In an embodiment, the magnets 210 will magnetically attach to the rotor body 202, though alternatively or additionally an adhesive may be used to secure the magnets 210 to the rotor body 202. In an embodiment, the magnets 210 are mounted on a distal end of the rotor body 202 opposite the flywheel 102.

Figure 8A:
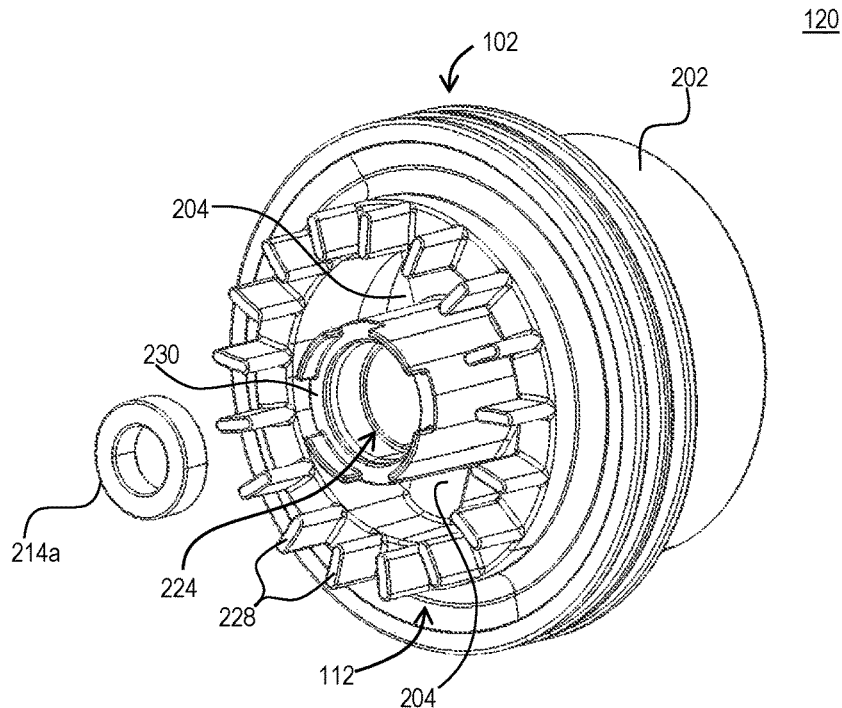
FIGS. 8A and 8B depict front and back views of the outer-rotor main body with the fan/rotor molded structure molded therein, according to an embodiment.
Figure 8B:
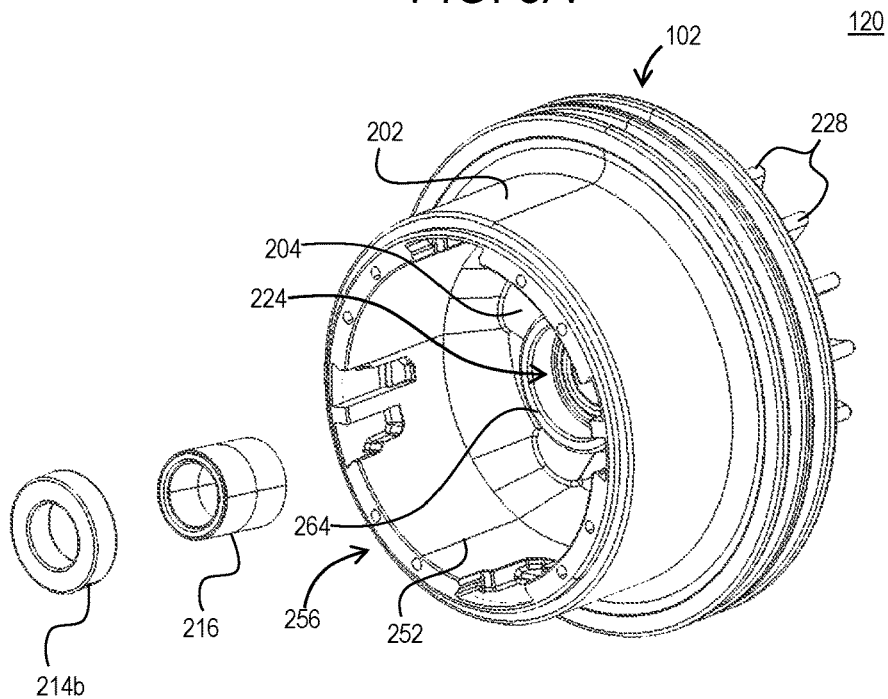

FIGS. 8A and 8B depict front and back perspective views of rotor assembly 120 including the flywheel 110 and rotor body 202, with the fan/rotor molded structure 220 molded therein, according to an embodiment. In this step of the assembly process, in an embodiment, the flywheel 110 and rotor body 202, including the magnets 210, are placed in a mold machine and the fan/rotor molded structure 220 is molded in the area inside the flywheel 110 and rotor body 202 in one molding step. The molding forms the radial fan blades 204, the axial fan 112, the bearing support member 224, and the sense magnet mount 230, all integrally as a part of a single molded structure.

Figure 9A:
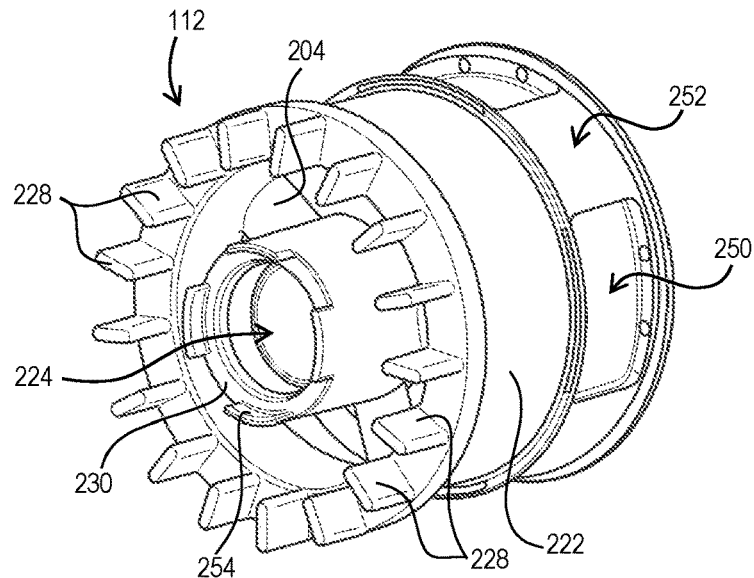
FIGS. 9A and 9B depict front and back views of the fan/rotor molded structure alone without the rotor main body, according to an embodiment.
Figure 9B:
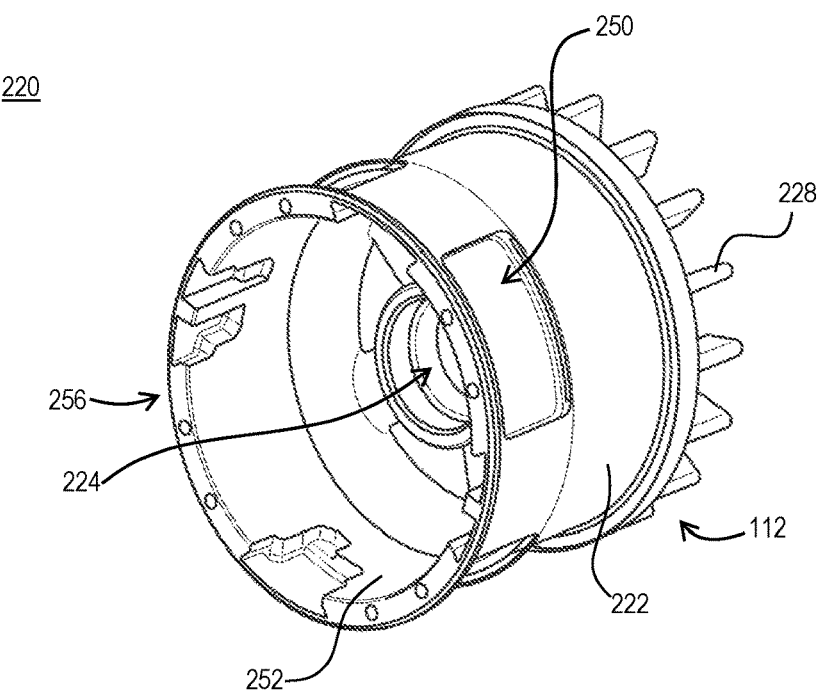

FIGS. 9A and 9B depict front and back perspective views of the fan/rotor molded structure 220 without the flywheel 110 and rotor body 202, according to an embodiment. As shown in these figures, extending from a main body 222 of the fan/rotor molded structure 220 is a magnet retention portion 252 with magnet pockets 250 around the rotor magnets 210 when the molding process is completed. In this embodiment, the rotor magnets 210 are completely covered with a layer of the molding of the magnet retention portion 252 disposed between the rotor magnets 210 and the stator assembly 130. It must be understood that alternative embodiments where the molding only partially covers the magnets 210 is within the scope of this disclosure.

In an embodiment, an inner surface of the main body 222 and the magnet cover portion 252 of the fan/rotor molded structure 220 are substantially formed along a same cylindrical plane. This cylindrical plane forms an opening 256 through which the stator assembly 130 is received within the rotor assembly 120.

In an embodiment, the fan/rotor molded structure 220 additionally includes radial fan blades 204 and bearing support member 224, including sense magnet mount 230 with retention features 274 for mounting and supporting sense magnet ring 212, as described above. In an embodiment, the fan/rotor molded structure 220 additionally includes blades 228 axially extending from the distal end 226 of the main body 222 to form the axial fan 122 proximate the end cap 140, as described above.

Referring back to FIGS. 8A and 8B, in an embodiment, once the molding process is complete, a spacer (or bushing) 216 is inserted into bearing support member 224, and rotor bearings 214a and 214b are press-fitted into the bearing support member 224 at the two ends of the spacer 216. In an embodiment, first bearing 214a is press-fittingly inserted axially into the bearing support member 224. The bearing support member 224 includes a first lip 260 (see FIG. 5) on its inner surface against which the first bearing 214a sits when fully inserted. Then, bearing spacer 216 is inserted into the opening of the bearing support member 224 opposite the first bearing 214a. Finally, the second bearing 214b is press-fittingly inserted into the bearing support member 224 until in comes in contact with a second lip 262 (see FIG. 5). In an alternative or additional embodiment, the bearings 214a, 214b may be secured inside the support structure via an adhesive.

In an embodiment, a distal end 264 of the bearing support member 224 where the second bearing 214b is located may slightly protrude from the end of the second bearing 214b. This portion of the bearing support member 224 may be crimped by, for example, heat-staking to axially retain the second bearing 214b within the bearing support member 224. The first bearing 214a may be axially retained via the sense magnet ring 212, as discussed below.

In an embodiment, as described above, the bearing support member 224 is attached to the main body 222 of the fan/rotor molded structure 220 via the radial fan blades 204. In an embodiment, the bearing support structure is radially aligned with the flywheel 102.

The arrangement of two rotor bearings within the bearing support member 224 of the fan/rotor molded structure 220 as described above offers several advantages. First, the rotor assembly 120 is supported on the motor shaft 110 by two bearings 214a, 214b that are both axially arranged on one side of the stator assembly 130. This greatly simplifies the assembly process, as the stator 130 can be assembled into the opening 246 of the rotor assembly 120 after the rotor assembly process is complete. Furthermore, the stator windings 134 become easily accessible on one side of the stator 130 opposite the bearing support member 224. As shown in FIG. 1, the three motor wires 72 from the control unit 70 read the stator 130 from one side of the motor 100 and are coupled (via soldering, fusing, etc.) directly to the stator windings 134. This greatly simplifies the routing and connectivity of the motor wires 72. Additionally, both bearings 214a, 214b are supported via a single structure, which saves space and material. Finally, the bearing support member 224 is supported by the radial fan blades 204, which further saves on space and material.

Figure 10A:
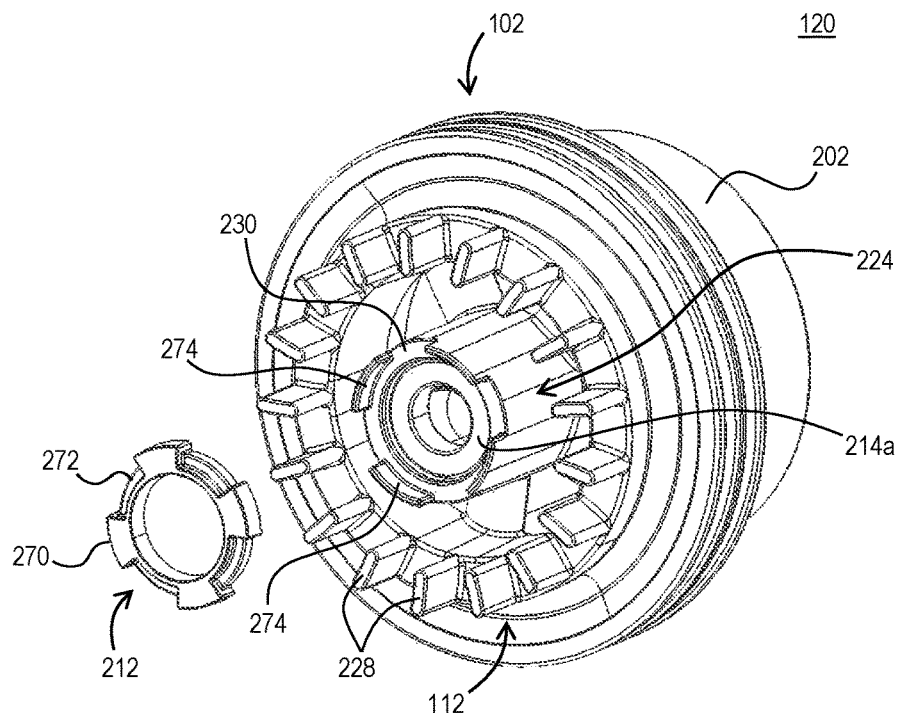
FIGS. 10A and 10B depict perspective views of the outer-rotor assembly with a sense magnet ring prior to and after assembly onto the fan/rotor molded structure, according to an embodiment.
Figure 10B:
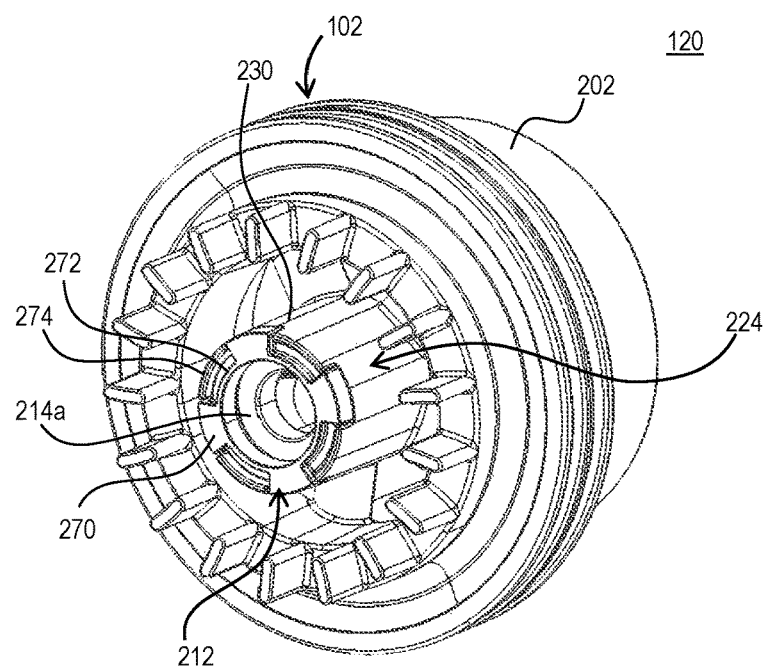

FIGS. 10A and 10B depict perspective views of rotor assembly 120, prior to and after the assembly of sense magnet ring 212, respectively, according to an embodiment. In an embodiment, the sense magnet ring 212 is a single piece magnet forms in the shape of a ring. The ring includes four magnetic poles that are aligned with the four poles of the rotor 120, i.e., with the four rotor magnets 210. The ring is positioned at close proximity to rotational position sensor board 150 (e.g. Hall sensor board) to allow the sensors 152 to detect the rotational position of the sense magnet ring 212, and thereby the rotor 120.

According to an embodiment of the invention, the sense magnet ring 212 includes projecting transition areas 270 aligned with the rotor magnets 210, and recessed areas 272 disposed between the projecting transition areas 270. In an embodiment, the transition areas between adjacent poles of the sense magnet ring are located at approximately the centers of the projecting transition areas 270. In other words, the ends of the opposite poles meet near the center of the projecting transition areas 270. The recessed areas 272 may be recessed radially or axially (or both axially and radially) with respect to the radially-projecting transition areas 270. In other words, the projecting transition areas 270 may be radially projecting with respect to an outer periphery of the recessed areas 272, or axially projecting with respect to an outer plate of the recessed areas 272. With this arrangement, the transition areas 270 have a higher magnetic flux as sensed by the sensors 152, allowing the sensors 152 to detect the magnetic transition between the poles more efficiently.

In an embodiment, and end of the bearing support structure 224 of the fan/rotor molded structure 220 includes sense magnet mount 230 having alignment and retention features 274 that receive and support the sense magnet ring 212. The alignment and retention features 274 include four axial projection formed around the periphery of the axial end of the bearing support structure224. In an embodiment, the radially-projecting transition areas 270 of the sense magnet ring 212 are received between the axial projections 274 of sense magnet mount 230. In an embodiment, sense magnet mount 230 may also include a notch or a similar keying feature for proper polar alignment of the sense magnet ring 212 with the sense magnet mount 230. In this manner, the mount and support for the sense magnet ring 212 is provided in the molding of the fan/rotor molded structure 224.

Figure 11:
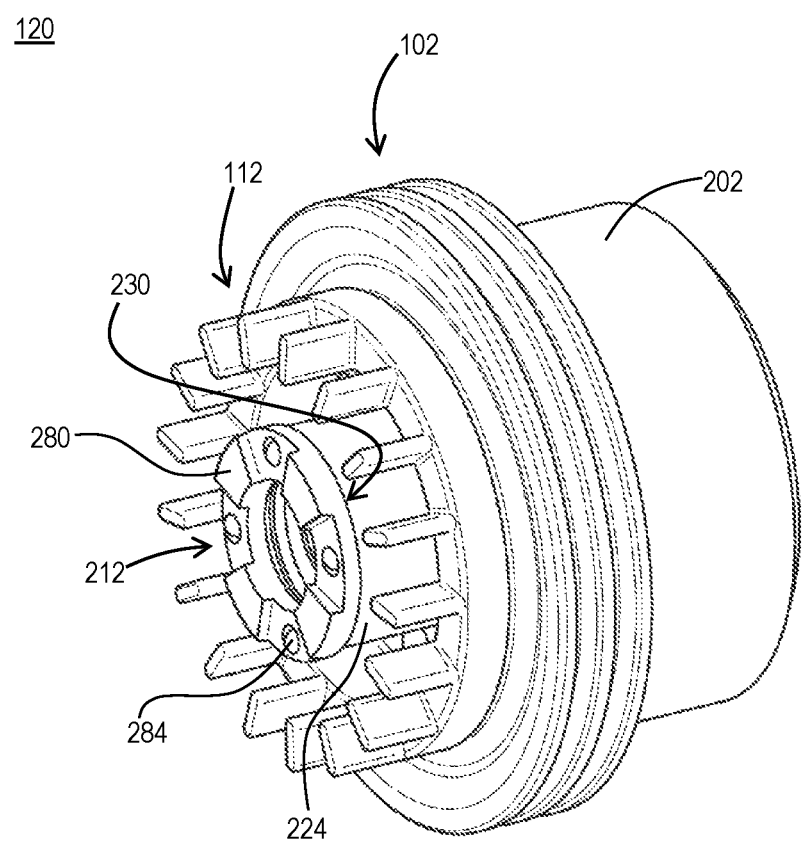
FIG. 11 depicts a perspective view of the outer-rotor having an alternative sense magnet ring assembled into the fan/rotor molded structure, according to an embodiment.

FIG. 11 depicts an alternative sense magnet ring 212 having transition areas 280 that are raised axially, but not radially, with respect to a plane of the recessed areas 282. This arrangement may be preferred where the positional sensors 152 (e.g., Hall sensors) are disposed further from the sense magnet 212 in the axial direction. In an embodiment, the ring 212 includes through-holes within the recessed areas 282 and the sense magnet mount 230 at the end of the bearing support structure 224 of the fan/rotor molded structure 220 includes corresponding legs 284 arranged to mate with the through-holes of the sense magnet ring 212.

Figure 12:
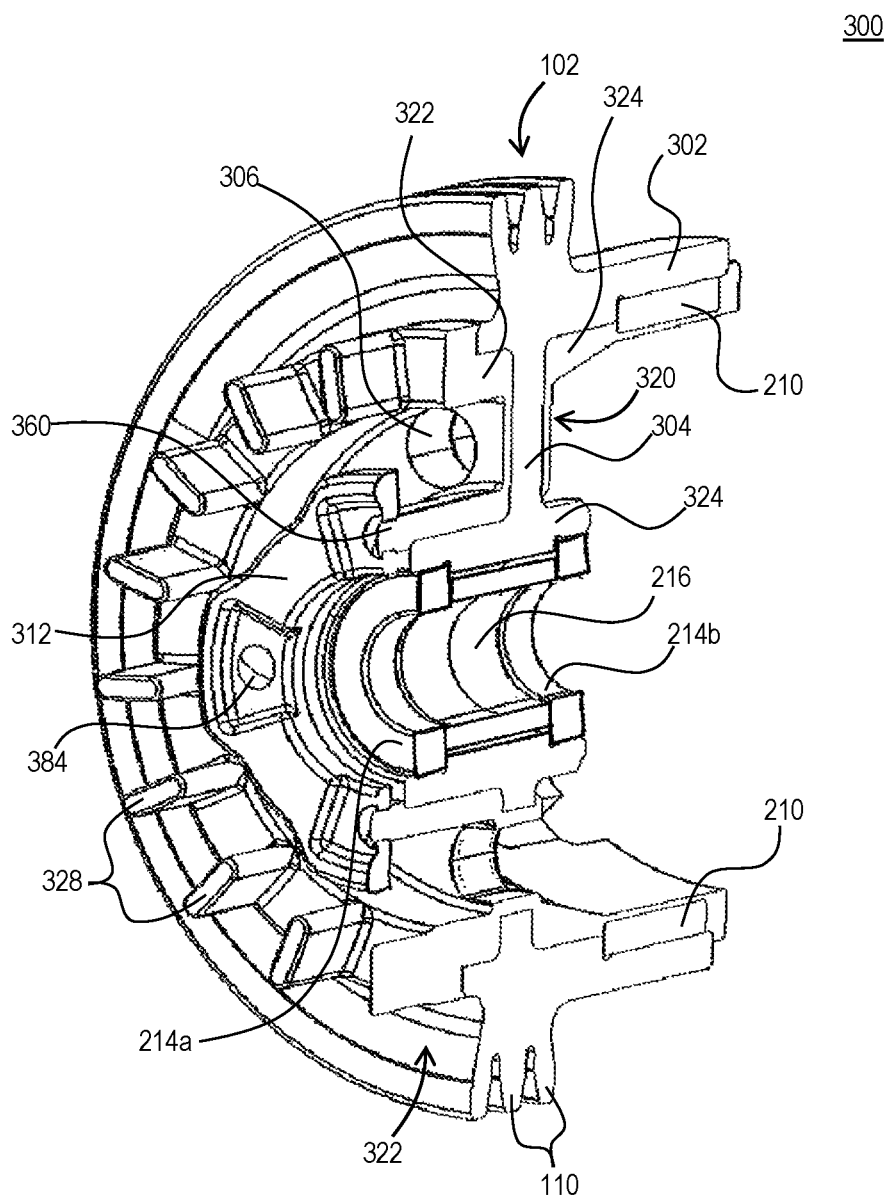
FIG. 12 depicts a partially cut-off perspective view of an outer-rotor assembly of the brushless motor, according to an alternative embodiment.
Figure 13:
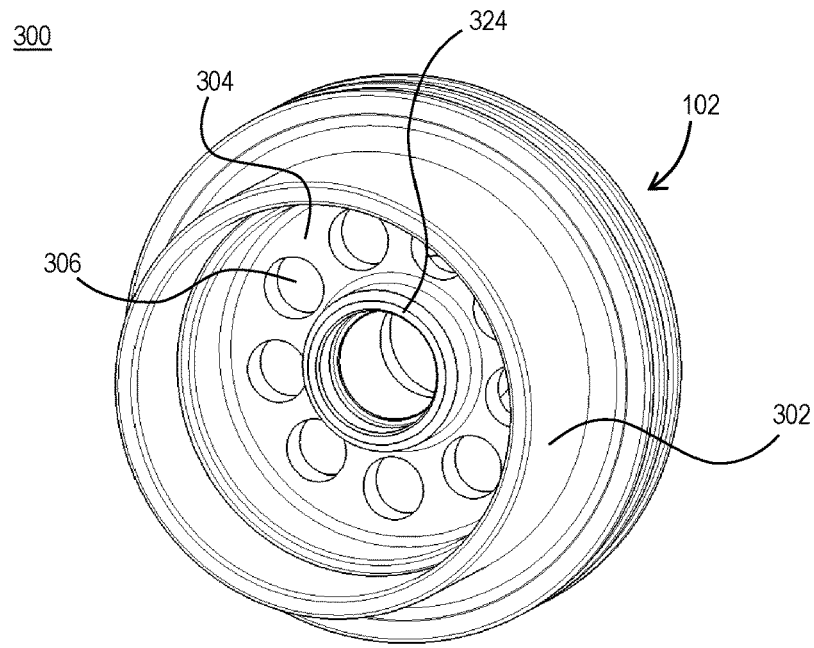
FIG. 13 depicts a perspective view of the alternative outer-rotor main body and flywheel, according to an embodiment.
Figure 14:
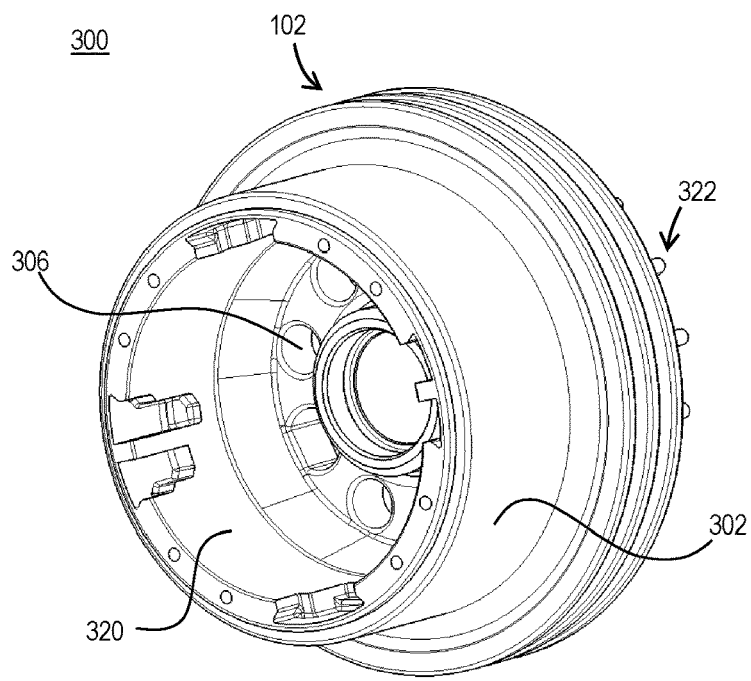
FIG. 14 depict a perspective view of the alternative outer-rotor main body with the fan/rotor molded structure molded therein, according to an embodiment.

A rotor assembly 320 is described herein with reference to FIGS. 12-14, according to an alternative embodiment of the invention.

FIG. 12 depicts a cut-off perspective view of the outer-rotor assembly 300, according to an embodiment of the invention. As shown in this figure, in an embodiment, outer-rotor assembly 300 includes a substantially-cylindrical metallic rotor body 302 on which the flywheel 102, including annular rings 110, is integrally formed. Rotor body 302 and flywheel 102 may be formed of any metallic material such as steel. Rotor magnets 210 are secured to an inner surface of the rotor body 302. A fan/rotor molded structure 320 is molded inside the rotor body 202 to form and/or support various rotor assembly 300 components, as discussed herein. In an embodiment, fan/rotor molded structure 320 is formed from epoxy, resin, plastic, or any other moldable non-conductive material.

FIG. 13 depicts a perspective view of the rotor assembly 300 with rotor body 302, but without the fan/rotor molded structure 320, according to an embodiment. FIG. 14 depicts a perspective view of rotor assembly 120 including the fan/rotor molded structure 220 molded onto the rotor body 302, according to an embodiment. In this embodiment, with reference to these figures and FIG. 12, the rotor body 302 integrally includes, in addition to the flywheel 102, a radial support plate 304 extending radially inwardly from the main body 302 towards a center of the rotor assembly 300, and a bearing support member 324 formed at the end of the radial support plate 304. In an embodiment, bearing support member 324 is substantially cylindrical-shaped and elongated, sized to press-fittingly receive and support one or more shaft ball bearings 214a, 214b, and a spacer 216 therebetween. In an embodiment, radial support plate 304 includes a plurality of axial through-holes 306 that around the bearing support member 324. Accordingly, in this embodiment, unlike the embodiment of FIGS. 5-11, the bearing support is formed as a part of the metallic rotor body 302.

In an embodiment, the fan/rotor molded structure 320 is similar to the previous embodiment, but is formed around the two sides of the radial support plate 304 and the bearing support member 324. In this embodiment, fan/rotor molded structure 320 includes a first mold portion 322 that forms blades 328 of axial fan 322 at the end of the main body 302, and a sense magnet ring support portion 360 at the end of the bearing support member 324 for mounting the sense magnet ring 312. The fan/rotor molded structure 320 also includes a second mold portion 324 that is formed around the rotor magnets 210. In an embodiment, the first and second mold portions 322, 324 are connected together through the through-holes 306.

Figure 15A:
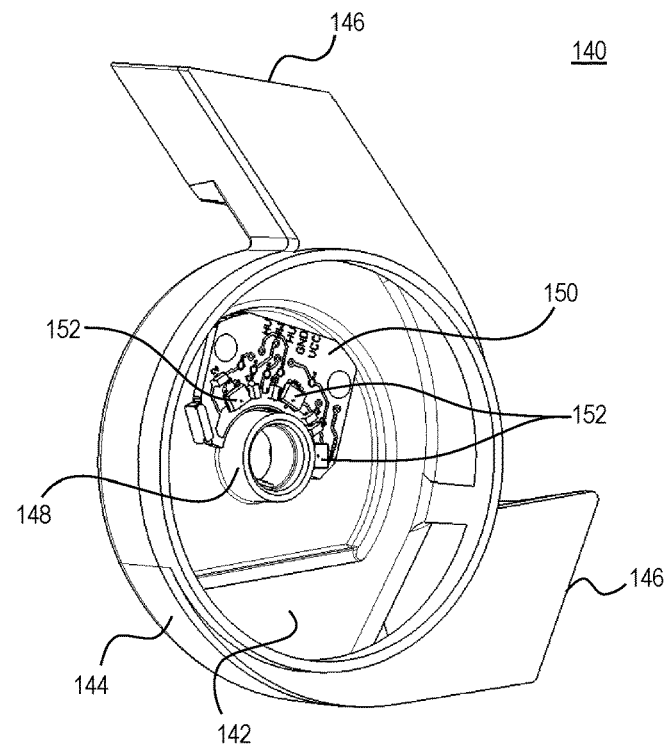
FIGS. 15A and 15B depict front and back perspective views of a motor end cap, according to an embodiment.
Figure 15B:
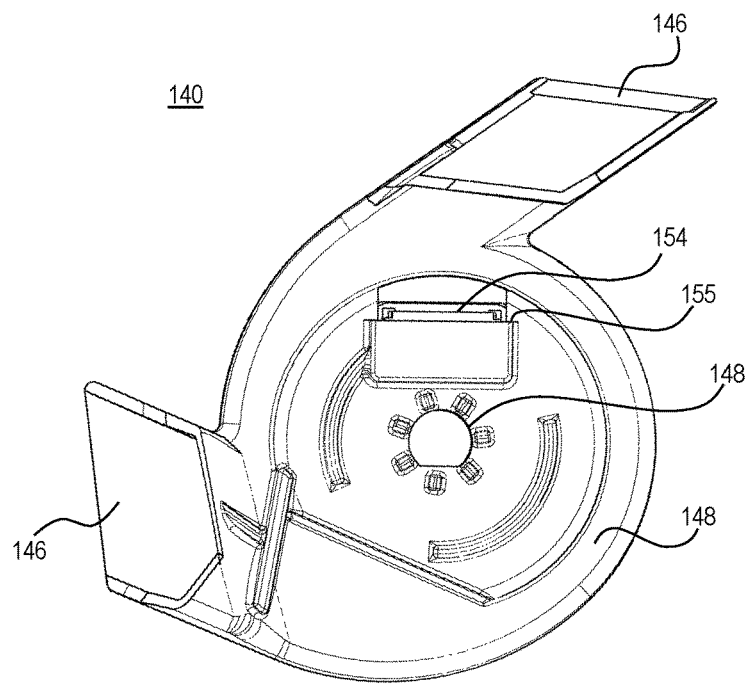

FIGS. 15A and 15B depict front and back perspective views of a motor end cap 140, according to an embodiment. In this embodiment, the motor end cap 140 includes a through-hole 148 that receives the motor shaft and a back plate 142 (i.e., a baffle) that is arranged in parallel to the axial fan 122 of the motor 100. At the periphery of the back plate 142 is provided a cylindrical circumferential portion 144 that mates with the end of the flywheel 102. The circumferential portion 144 receives the axial fan 122, as well as a portion of the bearing support structure 224 and the sense magnet ring 212 therein. The circumferential portion 144 includes two air conduits 146 that allow hot air generated by the fans through the motor to be expelled.

In an embodiment, end cap 140 further includes a rotational position sensor board 150 therein. Positional sensor board 150 may include, for example, three Hall sensors 152 facing the rotor 120 and a connector 154 projecting outside the back plate 142 to be accessible from outside the motor 100.

In an embodiment, the back plate 142 includes a slot 155. Positional sensor board 150 (e.g., Hall sensor PCB) is mounted on the inside of the back plate 142. In an embodiment, the board 150 includes a curved portion shaped to be disposed around the through-hole 148. The positional sensor board 150 includes three positional sensors 152 disposed around the through-hole 148. When the motor is fully assembled, the positional sensors 152 are in close proximity to the axially-projecting (or radially-raised) transition areas 270 of the sense-magnet ring 212 for an accurate rotational reading of the rotor 120. In an embodiment, a back surface of the positional sensor board includes connector 154 (including, e.g., three terminals for the three sensors) that is exposed through the slot 155. This arrangement allows the connection port to be accessible from outside the motor without having to route wires directly to the Hall sensors.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. An electric brushless DC (BLDC) motor comprising:
   an outer rotor assembly having a substantially-cylindrical metallic rotor body, and a plurality of rotor magnets mounted within an inner surface of the rotor body;
   a molded structure formed within the rotor body, the molded structure comprising: a main body formed on an inner surface of the rotor body to securely cover and retain the rotor magnets on the inner surface of the rotor body, an axial fan formed at an end of the rotor body opposite the rotor magnets, and a sense magnet mount formed at approximately a radial center portion of the axial fan;
   a stator assembly received inside the outer rotor assembly and mounted on a shaft; and
   a sense magnet ring mounted on the sense magnet mount.

2. The electric motor of claim 1, wherein the molded structure comprises at least one of a proxy, plastic, or resin material.

3. The electric motor of claim 1, the outer rotor assembly further comprising a flywheel integrally formed on an outer surface of the rotor body.

4. The electric motor of claim 1, wherein the molded structure further integrally comprises:
   at least one radial member projecting inwardly from the main body towards a center of the outer rotor assembly between the axial fan and the rotor magnets;
   and a bearing support member having a substantially cylindrical shape in an axial direction of the outer rotor and supported by the at least one radial member.

5. The electric motor of claim 4, wherein the at least one radial member comprises a plurality of radial fan blades angularly disposed to generate an airflow with the rotation of the outer rotor.

6. The electric motor of claim 4, wherein the bearing support member is configured to securely receive two bearings affixed to the shaft therein.

7. The electric motor of claim 1, wherein the rotor body integrally comprises:
   a radial member projecting inwardly from the inner surface of the rotor body towards a center of the outer rotor assembly between the axial fan and the rotor magnets; and
   a bearing support member having a substantially cylindrical shape in an axial direction of the outer rotor and supported by the at least one radial member.

8. The electric motor of claim 7, wherein the molded structure also includes a radial portion covering the ends of the radial member.

9. The electric motor of claim 7, wherein the radial member includes through-holes around the bearing support member to provide airflow communication between the axial fan and the stator assembly.

10. The electric motor of claim 7, wherein the bearing support member is configured to securely receive two bearings affixed to the shaft therein.

11. The electric motor of claim 1, further comprising an end cap affixed to an end of the outer rotor assembly opposite the stator assembly, the end cap including a positional sensor board disposed in close axial proximity to the sense magnet ring.

12. The electric motor of claim 1, wherein the stator assembly comprises a plurality of stator teeth and a plurality of stator windings formed around the stator teeth, the stator windings being accessible for connection of a plurality of lead wires from an open end of the outer rotor assembly opposite the sense magnet mount.

13. A power tool comprising a housing and an electric brushless DC (BLDC) motor according to claim 1 disposed within the housing.

14. An electric brushless DC (BLDC) motor comprising:
an outer rotor assembly having a substantially-cylindrical metallic rotor body and a plurality of rotor magnets mounted within an inner surface of the rotor body,
a molded structure formed within the rotor body, the molded structure integrally comprising; a main body formed on the inner surface of the rotor body, at least one radial member projecting inwardly from the main body towards a center of the outer rotor assembly between an axial fan and the rotor magnets, and a bearing support member having a substantially cylindrical shape in an axial direction of the outer rotor and supported by the at least one radial member; and
a stator assembly received inside the outer rotor assembly and mounted on a shaft, the shaft being received inside the bearing support member and affixed rotatably therein via two bearings affixed to the shaft therein.

15. The electric motor of claim 14, wherein the molded structure comprises at least one of a proxy, plastic, or resin material.

16. The electric motor of claim 14, the outer rotor assembly further comprising a flywheel integrally formed on an outer surface of the rotor body.

17. The electric motor of claim 14, wherein the molded structure integrally comprises a magnet retention portion covering and retaining the rotor magnets on the inner surface of the rotor body.

18. The electric motor of claim 14, wherein the molded structure integrally comprises the axial fan formed at an end of the rotor body opposite the rotor magnets.

19. The electric motor of claim 14, wherein the molded structure integrally comprises a sense magnet mount formed at an end of the bearing support member opposite the stator assembly, the electric motor further comprising a sense magnet ring mounted on the sense magnet mount.

20. The electric motor of claim 19, further comprising an end cap affixed to an end of the outer rotor assembly opposite the stator assembly, the end cap including a positional sensor board disposed in close axial proximity to the sense magnet ring.

21. The electric motor of claim 14, wherein the at least one radial member comprises a plurality of radial fan blades angularly disposed to generate an airflow with the rotation of the outer rotor.

22. The electric motor of claim 14, wherein the stator assembly comprises a plurality of stator teeth and a plurality of stator windings formed around the stator teeth, the stator windings being accessible for connection of a plurality of lead wires from an open end of the outer rotor assembly opposite the bearing support member.

23. A power tool comprising a housing and an electric brushless DC (BLDC) motor according to claim 14 disposed within the housing.

* * * * *